(12) United States Patent
May et al.

(10) Patent No.: US 7,481,436 B2
(45) Date of Patent: Jan. 27, 2009

(54) TWO PART GROMMET WITH HARD PLASTIC LOCKING PRONGS

(75) Inventors: Anthony J. May, Waterford, MI (US); Corey Dunham, Royal Oak, MI (US); Trevor R. Archer, Stratford (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 10/655,743

(22) Filed: Sep. 5, 2003

(65) Prior Publication Data

US 2004/0078926 A1  Apr. 29, 2004

Related U.S. Application Data

(60) Provisional application No. 60/409,266, filed on Sep. 9, 2002.

(51) Int. Cl.
*F16L 5/02* (2006.01)
*F16L 17/00* (2006.01)

(52) U.S. Cl. .............................. 277/606; 277/626; 16/2

(58) Field of Classification Search .................. 277/603, 277/606–609, 616, 626–627, 628, 630, 634–637, 277/640, 644, 650; 16/2–2.2; 174/65 G, 174/153 G
See application file for complete search history.

(56) References Cited

U.S. PATENT DOCUMENTS

| | | | | |
|---|---|---|---|---|
| 3,506,999 A | | 4/1970 | Neher | |
| 3,508,292 A | * | 4/1970 | Bond | 16/2.2 |
| 4,081,879 A | * | 4/1978 | Rubright | 16/2.2 |
| 4,784,285 A | * | 11/1988 | Patel | 220/782 |
| 4,885,121 A | * | 12/1989 | Patel | 264/255 |
| 4,966,374 A | * | 10/1990 | Oikawa et al. | 277/606 |
| 5,353,472 A | * | 10/1994 | Benda et al. | 16/2.2 |
| 5,659,924 A | * | 8/1997 | Gildersleeve | 16/2.1 |
| 5,836,048 A | * | 11/1998 | Rossman et al. | 16/2.2 |
| 5,870,799 A | * | 2/1999 | Benda | 16/2.1 |
| 6,082,782 A | * | 7/2000 | Bartholoma et al. | 285/140.1 |
| 6,159,409 A | * | 12/2000 | Benda | 264/255 |
| 6,495,766 B2 | * | 12/2002 | Takahashi | 174/138 R |
| 6,603,078 B2 | * | 8/2003 | Okuhara et al. | 174/153 G |
| 6,664,470 B2 | * | 12/2003 | Nagamoto | 174/652 |

FOREIGN PATENT DOCUMENTS

| | | |
|---|---|---|
| DE | 199 50 812 A1 | 5/2000 |
| DE | 199 04 549 A1 | 8/2000 |
| EP | 1 193 435 A1 | 4/2002 |
| FR | 2 744 781 | 8/1997 |

* cited by examiner

*Primary Examiner*—Vishal Patel
(74) *Attorney, Agent, or Firm*—Gifford, Krass, Sprinkle, Anderson & Citkowski, P.C.; Kevin S. MacKenzie; Dean B. Watson

(57) ABSTRACT

A grommet for sealing a cable to a panel opening includes a hard plastic part formed with curved locking prongs projecting at an angle from the perimeter of a main piece is molded to a soft elastomeric second part having a boot portion to receive the cable and a perimeter flange. The prongs lock to the panel upon being fully inserted into the panel opening.

7 Claims, 3 Drawing Sheets

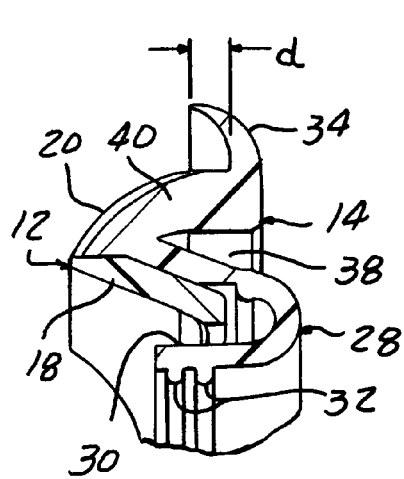
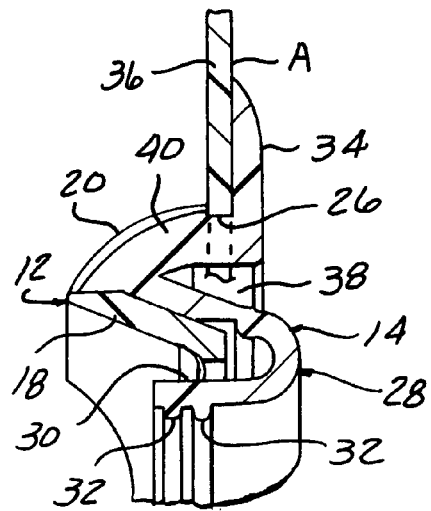
FIG. 4          FIG. 4A
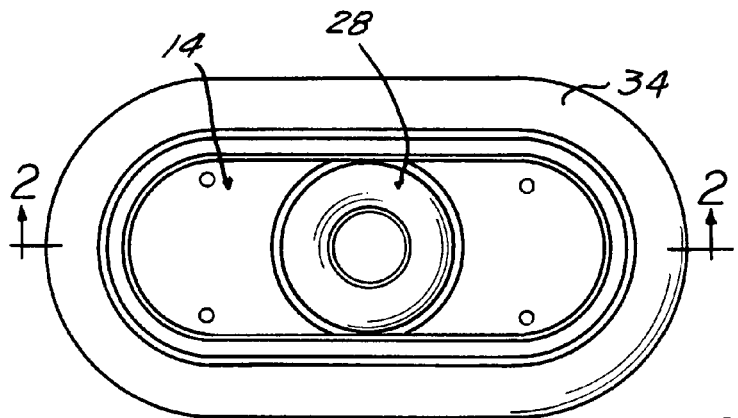
FIG. 5
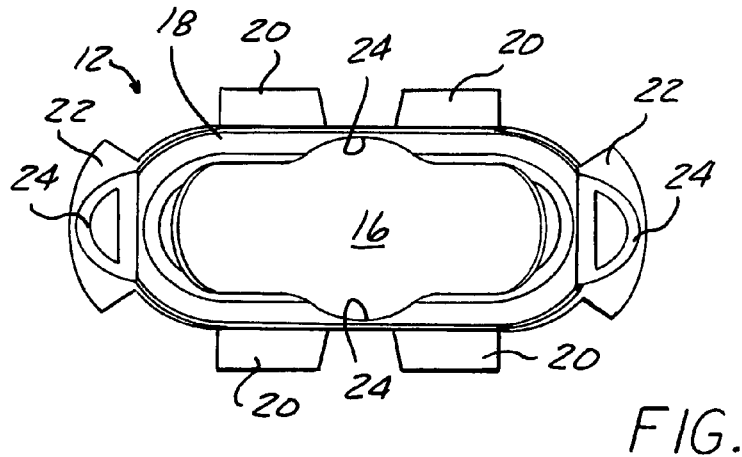
FIG. 6

TWO PART GROMMET WITH HARD PLASTIC LOCKING PRONGS

CROSS REFERENCE TO RELATED APPLICATIONS

This application claims the benefit of U.S. provisional Ser. No. 60/409,266, filed Sep. 9, 2002.

BACKGROUND OF THE INVENTION

This invention concerns grommets installed in panel holes to seal to elongated elements such as electrical or control cables passed through the panel holes and also are used to seal panel access holes. Grommets are pushed into the panel hole until a capturing feature passes through the hole and then springs out to capture the grommet against a sealing flange pressed against the opposite entry side of the panel. Grommets have in the past been constructed of soft rubber or other elastomers to insure an effective sealing pressure on the cable and panel surfaces.

However, the lack of stiffness has allowed the grommet to be dislodged from the panel by pressure exerted by the cable, particularly when the cable extends at a severe angle to grommet. There have heretofore been developed "dual durometer" grommets which have hard plastic portions embedded in a softer sealing elastomer. The panel mating portions have still been constructed of soft material such that dislodgement resistance is still not satisfactory in all applications.

Other problems include the necessity of exerting a high force on the grommet to install the grommet, and the difficulty assemblers have in determining when a grommet is fully seated.

It is an object of the present invention to provide a grommet which has a high resistance to dislodgment from the panel hole in which it is installed while still effectively sealing to a cable passed through the grommet and the panel hole.

It is another object of the invention to provide a grommet which is easily installed and provides an indication to the assembler when proper seating of the grommet has been achieved.

SUMMARY OF THE INVENTION

The above recited objects and other objects which will become apparent upon a reading of the following specification and claims are achieved by a two part grommet comprised of a first part molded from a suitable hard plastic having a very generally annular main piece defining a central opening. A series of spaced apart resiliently deflectable prongs are integrally formed around the perimeter of the main piece projecting radially outwardly and axially back at an angle over the main piece so as to form a generally V shaped space between the inside of the prongs and the main piece, the prongs having a curved outer survfice of a particular radius.

A second portion of a suitable soft elastomer is overmolded to the first part, having an outer flange portion projecting past the first part for sealing against one side of the panel. A boot portion is disposed within the central opening of the main body niece and has a tubular feature designed to sealingly grip the cable passed therethrough. The second part has portions bonded to the inside of the prongs as well as substantially filling the spaces between the prongs, and a relief space is provided therein to insure ready deflectability of the prongs.

A sealing flange extends radially from a projecting portion of the second part which projecting portion is sufficiently long to allow the tips of the prongs to snap back out over the opposite side of the panel when fully inserted, providing an audible indication when the grommet has been fully seated.

The curved outer shape of the prongs minimizes the insertion force required by increasing the angle of the contact reaction force as the prongs are advanced into the panel hole.

DESCRIPTION OF THE DRAWINGS

FIG. 4 is an enlarged fragmentary sectional view of an outer portion of the grommet shown in FIG. 1.

FIG. 4A is a fragmentary view of the section shown in FIG. 4 installed in a panel hole.

FIG. 5 is a reverse plan view of the grommet shown in FIG. 1.

FIG. 6 is a plan view of the hard plastic part of the grommet shown in FIG. 1.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
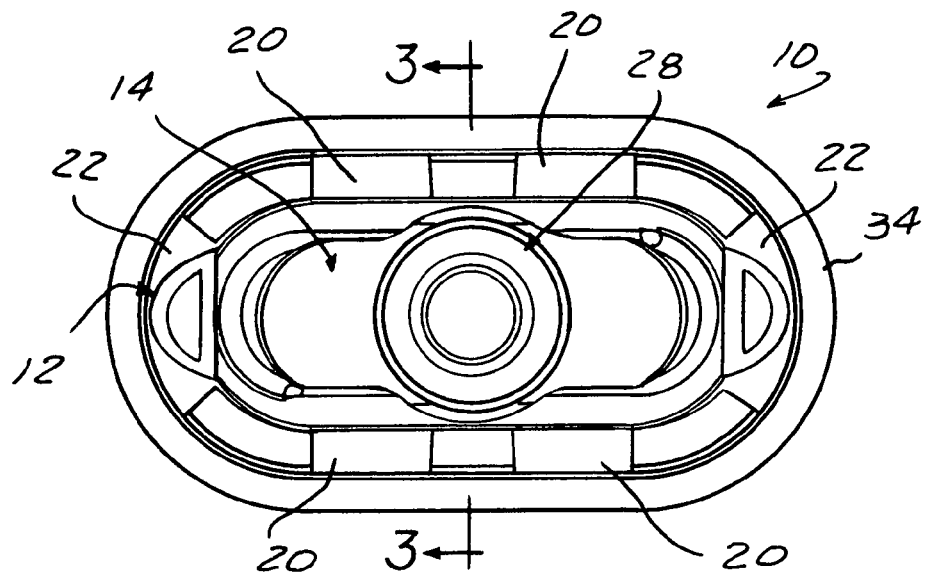
FIG. 1 is a plan view of a grommet according to the invention.
Figure 2:
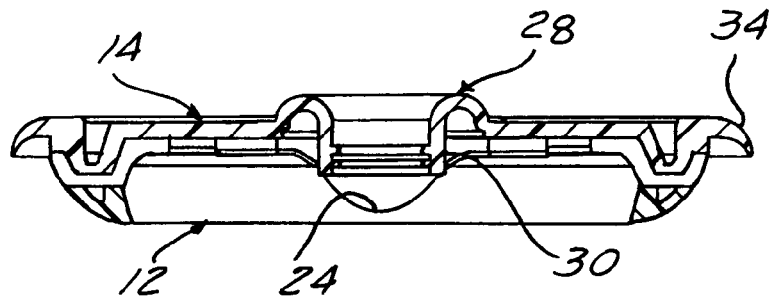
FIG. 2 is a new of a longitudinal section through the grommet shown in FIG. 1 taken along the lines 2-2 in FIG. 5.
Figure 3:
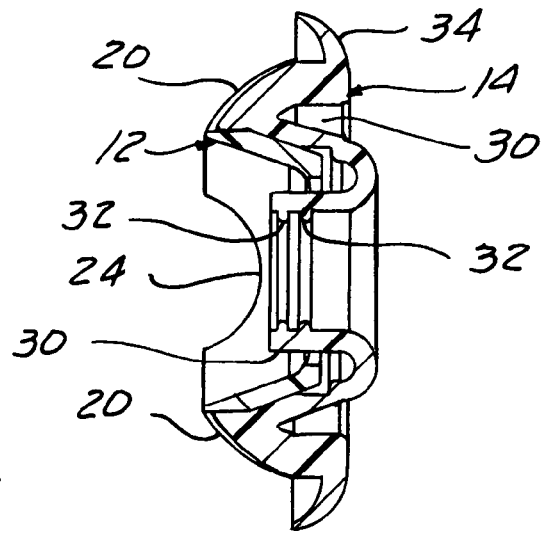
FIG. 3 is a view of the transverse section through the grommet of FIG. 1 taken along the line 3-3.
Figure 7:
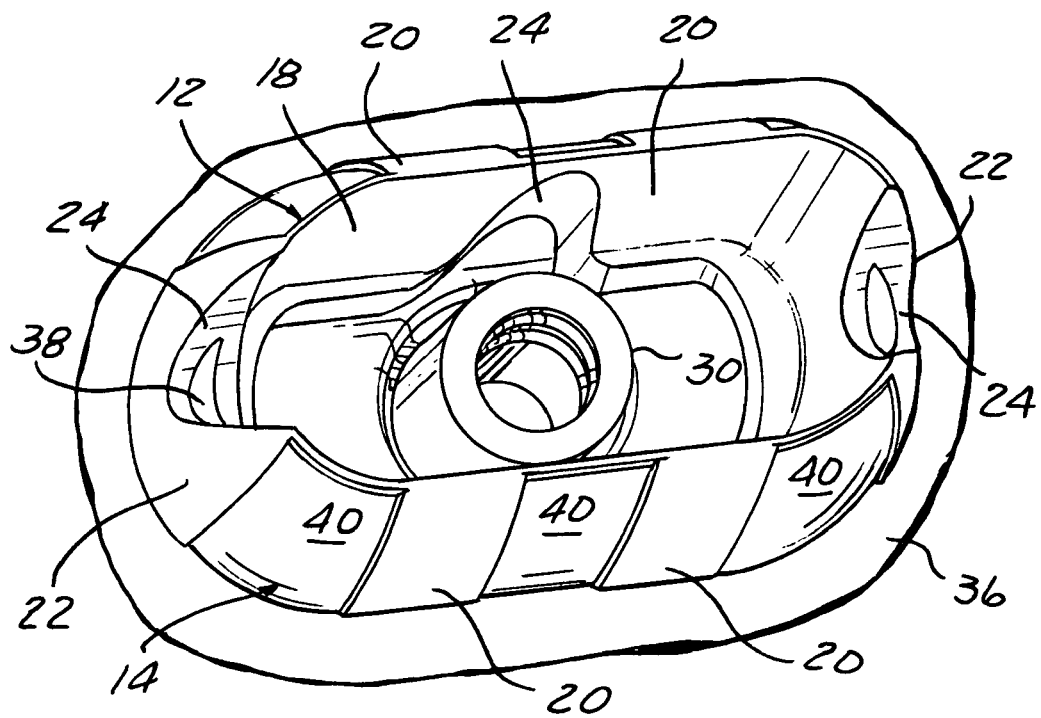
FIG. 7 is a perspective view of the grommet shown in FIG. 1 installed in a panel shown in fragmentary form.
Figure 8:
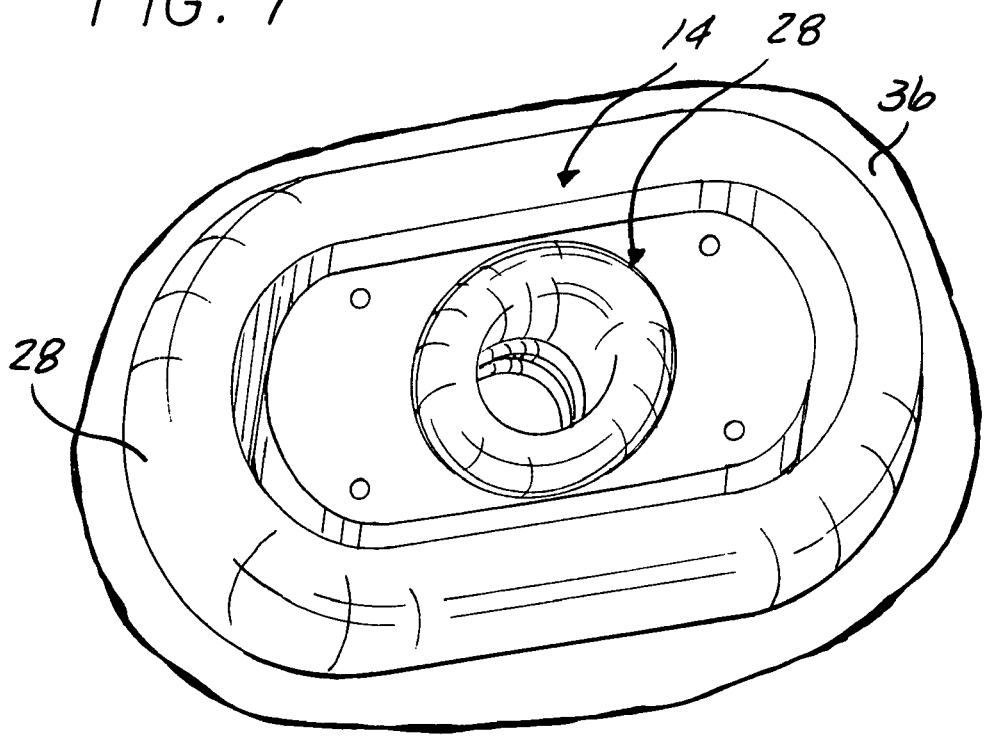
FIG. 8 is a reverse perspective view of the installed grommet section in FIG. 7.

Referring to the drawings, a grommet 10 according to the present invention is shown in FIG. 1, and is formed of two molded parts, a hard plastic part 12, and a soft elastomeric part 14, which may be molded in a two shot process, so as to be melt bonded together. The materials are preferably compatible so as to produce the melt bonding. A suitable compatible material for the hard plastic part 12 includes polypropylene (glass fiber reinforced 8-10%) and for the soft elastomeric part 14 SANTOPRENE™, a thermoplastic elastomer produced by Monsanto comprised of particles of vulcanized rubber in a plastic base.

Other candidates for the hard plastic include nylon, polyolefin, ABS, and other crystalline thermoplastics, and thermo set materials such as vinyl ester and polyester. Other materials for the soft part include isoprene, natural rubber, butyl, EPDM, nitrile, neoprene, polyacrylate, silicone, epichlorohydrin, plastomers and other synthetic elastomers.

The hard plastic first part 12 is shown by itself in FIG. 6, includes an elongated generally annular main piece 18 defining a central opening 16. The elongated annular main piece 18 defines an axially extending wall angled in towards the central opening 16 and has pairs of thin walled projecting locking side prongs 20 integrally formed therewith and extending radially out but angled over the generally annular main piece 18 to form a generally V shaped intermediate space between the outside of the main piece 18 and the inside of the prongs 20. The locking side prongs 20 are curved along a particular radius for a purpose to be described below.

An end locking prong 22 is integrally formed at each end of the main piece 18, angled back over main piece 18 to form a V shaped intermediate space and each also of a curved shape similar to the side prongs 20.

Scalloped clearance spaces 24 are formed centered into each side and at each end to accommodate sharply angled cables (not shown).

The angled back locking prongs 20, 22 are sized so that the outer ends will be resiliently deflected inwardly radially as the grommet 10 is inserted into a panel hole 26 (FIG. 4A). The outside of the prongs 20, 22 are curved to a selected radius. This radiused shape has been found to lower the insertion force required since the angle of the force vector acting on the prongs 20, 22 as a result of contact with the edge of the panel hole decreases, as the prongs are advanced and deflected during insertion. This progressive decrease in that angle reduces the peak force required to compress the prongs sufficiently to completely pass through the panel hole as compared to a simple straight chamfer shaped prong, since the contact angle remains constant.

The radius of the outer curved surface of the prongs 20, 22 chosen is a function of two variables. The first variable is the "normal angle" which is the angle of the normal reaction force to the plane of the opening at initial contact of the grommet prongs 20, 22 with the edge of the panel hole 26. The normal angle should be designed to be greater than 60°. This is to maximize the compressive effect and minimize the insertion resistance component of the two vectors of the normal force. The second variable is the amount of required overlap or interference far retention purposes. This overlap also affect insertion efforts if the material needs to be compressed too much.

The oval hole for a particular grommet measured 63.5 mm×31.75 mm. That grommet measured 66.1 mm×33 mm, giving 2.6 mm of overlap lengthwise and 1.25 mm of overlap across the width. With these given overlaps and the normal angle target, a lead in surface with a radius of 10.2 was developed to satisfy all requirements for this part. The normal contact angle is greater than 60° at contact and decreases to 0° as the inclination of the prong surface in contact with the edge of the panel hole increases to 90° as the part is inserted. The insertion efforts for this grommet are significantly less than with a part with a prong shape having a chamfered lead in, i.e., are reduced by at least half.

The soft elastomeric part 14 of the grommet 10 is molded to the hard plastic part 12, and includes a central boot lying within the central opening 16 of the hard plastic part 12. The boot includes tubular neck 30 sized to sealingly grip the cable to be passed through the grommet 10, annular ribs 32 aiding in gripping and sealing to the cable.

The soft elastomeric part 14 is also formed with a flange 34 extending radially outward around the perimeter of the part 14 axially offset from the outer tip of the prongs 20, 22. The flange 34 is normally molded to be flared towards the side of the panel 36 from which the grommet 10 is inserted so as to be flattened out against the panel surface A as the grommet 10 is fully seated in the panel opening 26 (FIG. 4A). The shape creates a greater sealing pressure exerted by the flange 34.

The soft elastomeric part 14 has intermediate portions extending into the V shaped intermediate space between the each of the prongs 20, 22 and main piece 18 creating a bonded connection between parts 12, 14.

Since the prongs 20, 22 also compress the intermediate portions of the part 14, a V shaped in section space 38 is also formed into the soft elastomeric part 14 to maintain flexibility of the prongs 20, 22, while still bracing the same against buckling after the grommet 10 is fully seated in the panel hole 26 (FIG. 4A). A thick wall 40 of soft elastomeric material is thereby formed extending along the intermediate spaces between the prongs 20, 22 and the main piece 18, which is bonded thereto.

After the tips of the prongs 20, 22 have been moved past the far edge of the panel hole 26, the prongs 20, 22 snap back out, emitting an audible sound, and providing a tactile feedback to the installer, indicating that the grommet 10 is fully installed. The bracing of the relatively thin walled prongs 20, 22 with the wall 40 of the part 14 strengthens the same against buckling to provide a strong resistance to pull out.

The axial distance D between the inside surface of the flange 34 and the tip of the prongs 20, 22 is selected to insure that the prongs 20, 22 will snap out radially when the grommet 10 is fully seated. This also insures panel hole edge contact only with the soft second part 14, which provides an additional area of sealing in addition to the flange 34.

The invention claimed is:

1. A grommet for use with a cable and for sealing a hole formed in a panel comprising:
    a first part, the first part including a main piece defining an opening;
    a series of resiliently deflectable prongs separated from each other to define spaces between the prongs, the series of prongs projecting from the main piece to define a relief on a back face of the main piece between the prongs and the main piece; the prongs including an outer contact surface having a profile curved to increase the angle of the contact force as the prongs are advanced into the hole to decrease The vector force on the prongs, the prongs of a shape and material to provide audible indication that the grommet has been seated;
    a second part formed of an elastomeric material the second part formed of a material softer than a material of the first part, the second part attached to the first part and extending into the spaces between the prongs to bond each prong to an adjacent prong, the elastomeric material extending into the relief between the prongs and the main piece, the second part including a boot portion disposed within the opening of the first part, the boot portion for sealingly engaging the cable, and a flange portion for sealing against the panel, the boot portion extending in a direction opposite of a contact with the panel; and
    clearance scallops formed on a front face of the main piece for accommodating angular movement of the boot portion from an angled cable extending through the boot portion of the second part wherein the boot portion remains sealed to the cable.

2. The grommet of claim 1 wherein the outer contact surface is curved along a radius.

3. The grommet of claim 2 wherein an angle of a normal reaction force vector relative to a plane of the hole changes along the radius.

4. The grommet of claim 2 wherein the radius is selected such that the angle of the normal reaction force vector relative to the plane of the hole at an initial contact of the prong with the edge of the hole exceeds sixty degrees.

5. The grommet of claim 4 wherein the prong is sized relative to the second part to provide a gap sufficient to be inserted through a thickness of the panel wherein the prongs lock against a side of the panel when the grommet is seated in the hole.

6. The grommet of claim 1 wherein the grommet includes an elongated generally rounded shape defining two sides and two ends, and wherein two prongs are located on each side, and one prong is located on each end.

7. The grommet of claim 1 wherein the first part is formed of glass filled polypropylene and the second part is formed of a soft thermoplastic elastomer.

* * * * *